United States Patent [19]
Kurakake et al.

[11] Patent Number: 4,916,375
[45] Date of Patent: Apr. 10, 1990

[54] SERVOMOTOR CONTROL APPARATUS

[75] Inventors: Mitsuo Kurakake, Hino; Keiji Sakamoto, Hachioji, both of Japan

[73] Assignee: Fanuc Ltd., Minamitsura, Japan

[21] Appl. No.: 243,032

[22] PCT Filed: Dec. 11, 1987

[86] PCT No.: PCT/JP87/00968
§ 371 Date: Aug. 4, 1988
§ 102(e) Date: Aug. 4, 1988

[87] PCT Pub. No.: WO88/04446
PCT Pub. Date: Jun. 16, 1988

[30] Foreign Application Priority Data
Dec. 12, 1986 [JP] Japan .................... 61-296388

[51] Int. Cl.$^4$ ............................... G05B 11/01
[52] U.S. Cl. ...................... 318/630; 318/677; 318/600; 318/567; 318/603
[58] Field of Search ............ 318/630, 677, 600, 567, 318/603

[56] References Cited
U.S. PATENT DOCUMENTS

| | | | |
|---|---|---|---|
| 4,196,380 | 4/1980 | Gustavsson et al. | 318/630 |
| 4,743,822 | 5/1988 | Futami et al. | 318/610 |
| 4,743,823 | 5/1988 | Fujita | 318/630 |
| 4,792,738 | 12/1988 | Yamazaki et al. | 318/630 |

*Primary Examiner*—William M. Shoop, Jr.
*Assistant Examiner*—Saul M. Bergmann
*Attorney, Agent, or Firm*—Staas & Halsey

[57] ABSTRACT

The invention is a servomotor control apparatus for controlling the positioning of a movable element of an industrial robot or NC machine tool. An NC unit or a robot controller detects displacement from a movable element that is to be positioned, such as a table, forms a position command regarding a servomechanism, and has a correction circuit (A) which receives quadrant data (BLF) regarding a backlash correction command. When there is a quadrant reversal for each axis of the movable element, frictional torque corresponding to the axis is stored and a torque correction command (FR) corresponding thereto is outputted. A torque command of a fully-closed loop servo system for performing control based on a fed back position detection signal is corrected by the torque correction command. The servomotor control apparatus can be applied to semi-closed loop servo system in which a backlash correction is possible, and not just to a fully-closed loop servo system.

6 Claims, 4 Drawing Sheets

SERVOMOTOR CONTROL APPARATUS

FIELD OF THE INVENTION

This invention relates to a servomotor control apparatus for controlling the positioning of a movable element of an industrial robot or NC machine tool.

DESCRIPTION OF RELATED ART

A fully-closed loop-type control circuit is illustrated in FIG. 3 as an example of a CNC servo-control circuit. In the Figure, an information processing circuit X includes a CPU and a memory and forms a command signal for a servomechanism Y. The servomechanism Y is constituted by a comparator circuit a for comparing the command signal and a fed back position signal, a servo drive circuit b to which are inputted an error signal obtained by the comparator circuit a and a fed back velocity signal, a servomotor c, a velocity detector d for detecting the velocity of the servomotor c, and a linear scale e for position detection mounted on a mechanical load f such as a table.

The characterizing feature of a fully-closed loop servo system is that an arrangement in which the machine body is incorporated in the positioning servo loop is realized by mounting the position detector on the mechanical load f of the servomotor.

FIG. 4 is a block diagram of a servo system of this type, in which K denotes position gain, $k_1$ and $k_2$ gains, $T_L$ disturbance, $K_T$ a torque constant, $J_m$ rotor inertia, and $J_L$ load intertia.

The relationship between the position command and torque command of the servo system shown in FIG. 4 can be expressed by representing an integration term ($Z^{-1}$) by a transfer element subjected to a Z conversion (a pulse transfer function conversion), as shown in FIG. 5. In FIG. 5, MC(i) indicates a move command formed by an NC apparatus, VEL(i) indicates a servomotor velocity signal, and POS(i) represents an amount of movement of the machine in a sampling period T.

Besides using this fully-closed loop system, it is also possible to carry out positioning control by a semi-closed loop-type servo-control system which extracts a position signal from a servomotor output shaft in front of the mechanical load or from a ball screw shaft coupled to the servomotor output shaft. With this system, a comparatively inexpensive resolver, pulse encoder or the like is used as a position detecting element and it is possible to realize dynamic precision. However, since a mechanism-related error such as feed screw pitch error has a direct influence upon control precision, static precision with regard to position is poor in comparison to dynamic precision. The type of, servo-control system that is used is determined by the user depending upon the type of position detecting element employed and to what degree of accuracy the mechanical load is to be controlled. However, there are many cases in which an NC apparatus will make common use of both systems.

When the rotating direction of a servomotor changes in response to a command for changing the direction of movement of a table or arm, a response delay regarding the position command occurs in accordance with the servomotor velocity-torque characteristic shown in FIG. 2. Response delays occurs because each axis of the mechanical load possesses a control error element ascribable to backlash or friction. In other words, the rotation of the servomotor of a predetermined axis approaches a stopped state when there is a reversal in the direction of rotation, and torque is no longer proportional to velocity before and after the operating quadrant reverses.

With the semi-closed loop servo-control system, a backlash command from the NC apparatus side is inputted to the servomechanism together with the position command, thereby correcting the servomotor position signal to improve upon the response delay when the direction of rotation reverses. However, as described in connection with FIG. 3, the fully-closed loop servo-control system is arranged so that the mechanical load is included in the positioning servo loop, and a backlash component is contained in the position signal obtained from the linear scale e. As a result, the servo-control system position signal cannot be corrected by the backlash correction outputted from the NC apparatus side. In consequence, the backlash correction command cannot be used commonly by the same NC apparatus in both the semi-closed loop servo-control system and fully-closed loop servo-control system. Accordingly, there is a decline in the utilization efficiency of the NC apparatus and the response delay at the time of the reversal in direction cannot be ameliorated with regard to the machine in the fully-closed loop servo-control system.

SUMMARY OF THE INVENTION

The present invention has been devised in order to solve the aforementioned problem and its object is to provide a servomotor control apparatus which, by forming a torque command that takes frictional resistance into consideration, is suitable for application to both a semi-closed loop servo-control system and a fully-closed loop servo-control system.

In accordance with the present invention, there is provided a servomotor control apparatus for controlling movement of a mechanical load by a position command and a compensating backlash correction command for backlash at the mechanical load, comprising: position signal detecting means for detecting a position of the mechanical load; discriminating means for discriminating, based on the backlash correction command, a timing at which an operating quadrant of the mechanical load of a servomotor reverses; correcting means for correcting, by offset data corresponding to frictional resistance of the mechanical load, a torque command formed from the position signal and the position command when the quadrant reverses; and control means for driving and controlling the servomotor by the corrected torque command.

Accordingly, with regard to the fully-closed loop-type servo system, the servomotor control apparatus of the present invention inputs a backlash correction command and data indicative of the servomotor operating quadrant together with an ordinary position command, and outputs a torque command. The torque command corresponds to frictional torque of the machine at the time of the quadrant reversal. This torque command is provided to the servomotor as offset data. As a result, a response delay regarding the position command at the time of the quadrant reversal can be ameliorated. In addition, a backlash correction command from the same NC apparatus can be used for control in servo-control systems of both the semi-closed and fully-closed loop type.

DESCRIPTION OF THE PREFERRED EMBODIMENT

An embodiment of the present invention will now be described in detail with reference to the drawings.

Figure 1A:
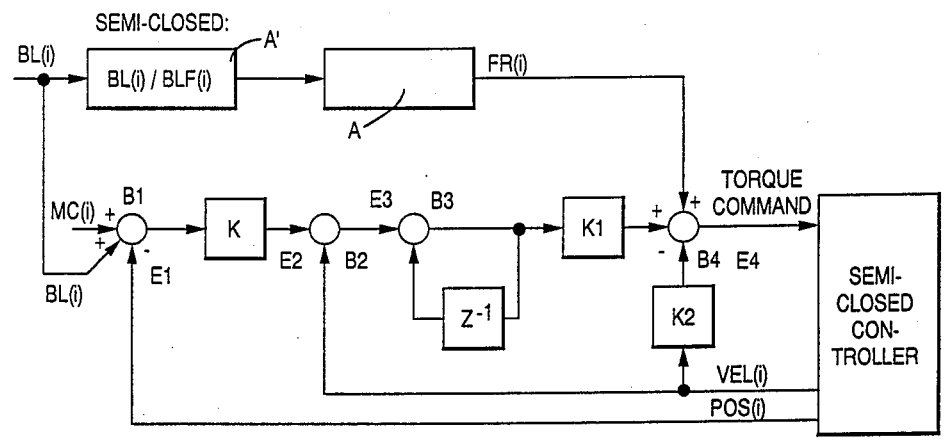
FIG. 1(a) is a block diagram illustrating the general arrangement of the present invention, in the environment of a semi-closed loop servo control system.
Figure 1B:
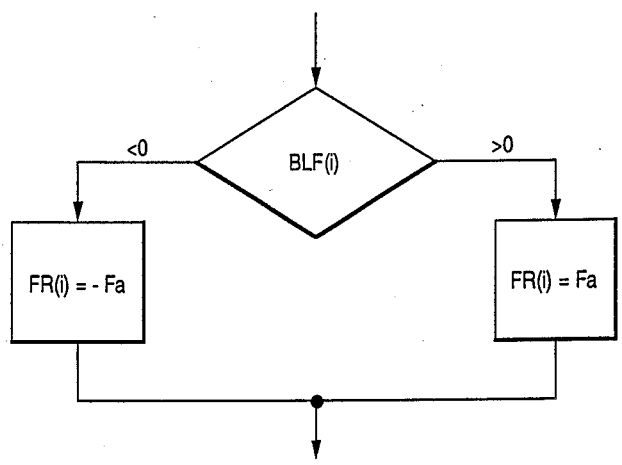
FIG. 1(b) is a flowchart illustrating the general arrangement of the present invention.
Figure 1C:
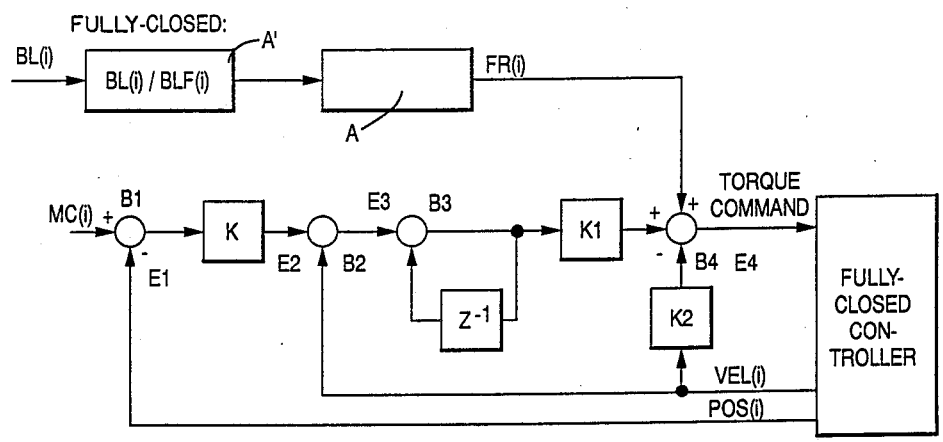
FIG. 1(c) is a block diagram illustrating the general arrangement of the present invention in the environment of a fully-closed loop servo control system.

FIGS. 1(a) and 1(c) are block diagrams illustrating the general arrangement of the invention. In the FIG. 1(a), an NC apparatus outputs a position command MC(i) and a backlash correction command BL(i) to a semi-closed loop type servo-control system. The position command MC(i) is and correction command BL(i) are inputted to a comparator $B_1$, which compares the position command MC(i) and a position signal POS(i) to form an error signal $E_1$. The error signal $E_1$ is multiplied by the position gain K and the product is inputted to a comparator $B_2$ as a velocity command $E_2$. The comparator $B_2$ compares the velocity command $E_2$ with the servomotor velocity signal VEL(i) to form an error signal $E_3$. The error signal $E_3$ is outputted to a comparator $B_4$ via a comparator $B_3$, integration term $Z^{-1}$ and gain $k_1$, and is operated on by the velocity signal VEL(i) fed back to the comparator $B_4$ via gain $k_2$. The comparator $B_4$ outputs the torque command for the servomotor.

Figure 2:
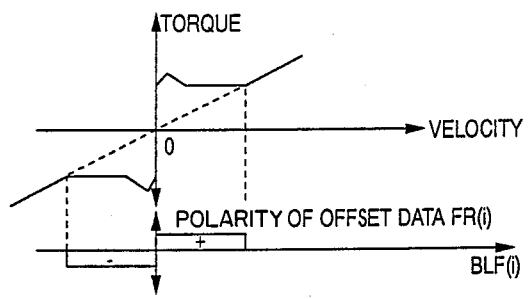
FIG. 2 is view illustrating a velocity-torque characteristic.
Figure 3:
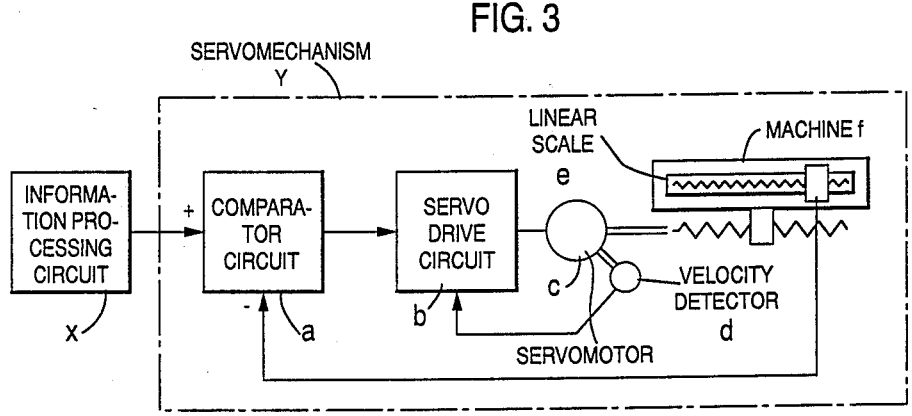
FIG. 3 is a circuit diagram of a fully-closed loop-type servomotor control apparatus.
Figure 4:
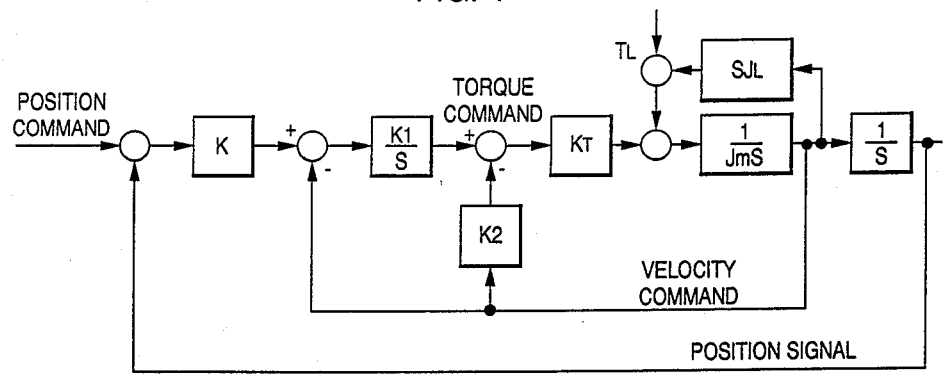
FIGS. 4 and 5 are block diagrams of a servo-control system.
Figure 5:
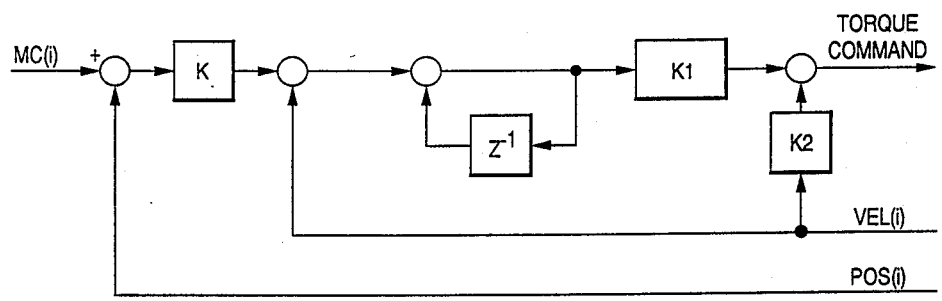

A backlash correction flaq BLF(i) formed from the backlash correction command BL(i), as illustrated in FIGS. 1(a) and 1(c) by a', is input to a correction circuit A. If the velocity-torque characteristic of the servomotor is as shown in FIG. 2, the correction circuit A receives the correction flag BLF(i) inputted as quadrant data regarding the backlash correction command. In there is a reversal in the operating quadrant, which is detected for each axis, of the movable element, time the torque correction command FR(i) corresponding to stored frictional torque is outputted. More specifically, a torque command corresponding to frictional torque of the machine is applied as offset data, as shown in the operating flow of FIG. 1(b), in accordance with operating region data at the time the direction of rotation reverses.

That is, offset data FR(i) (torque correction command) is formed and inputted to the comparator $B_4$. The offset data FR(i) is as follows, with reference to FIGS. 1(b) and 2:

$$FR(i) = -Fa \quad (1)$$

for the third quadrant [BLF(i) <0]; (where Fa represents a preset frictional torque of the machine) and $$FR(i) = Fa \quad (2)$$

for the first quadrant [BLF(i) >0].

In the semi-closed loop-type servo-control system, the backlash correction command BL(i) is inputted directly to the comparator $B_1$ or $B_2$ to correct the position signal. In the fully-closed loop-type servo-control system, the mechanical load itself is disposed in the positioning servo loop, as mentioned above. As a result, a backlash component is contained in the position signal, so that the position signal itself cannot be corrected. Accordingly, offset data FR(i) (torque correction command) the polarity of which is decided by the backlash correction flag BLF(i) based on the quadrant data of the velocity-torque characteristic is inputted by an open loop at the position at which the torque command in the servo loop is formed, as shown in FIG. 1(a) and FIG. 1(c). The reason for this is that since the move command issued in the servo system usually is substantially zero at the time of the reversal in the direction of rotation, the polarity of the torque command cannot be discriminated from the polarity of the move command. Thus, an improvement in response delay is achieved by forming the torque command at the time of the reversal in direction from the quadrant data regarding the backlash correction command for correcting the velocity-torque characteristic.

Though an embodiment of the present invention has been described, the invention is not limited thereto but can be modified in various ways without departing from the scope of the claims.

INDUSTRIAL APPLICABILITY

The servomotor control apparatus of the present invention can be applied to a servo system adapted to perform feedback of a machine position and not servomotor position in response to a position command.

We claim:

1. A servomotor control apparatus for controlling movement of a mechanical load in response to a position command and to a backlash correction command for correcting backlash at the mechanical load, comprising:
    position detecting means for detecting a position of the mechanical load;
    discriminating means for discriminating, based on the backlash correction command, a time at which an operating quadrant of the mechanical load reverses;
    correcting means for receiving offset data corresponding to frictional resistance of the mechanical load, and for generating a corrected torque command based on the offset data, the detected position and the position command when the quadrant reverses; and
    control means for driving and controlling the mechanical load based on the corrected torque command.

2. A servomotor control apparatus according to claim 1, wherein said position signal detecting means comprises an optical linear scale.

3. A servomotor control apparatus according to claim 1, wherein said correcting means comprises means for storeing the offset data corresponding to a frictional resistance value for each axis of the mechanical load.

4. A servomotor control apparatus according to claim 1, wherein said control means comprises either a semi-closed loop servo system or a fully-closed loop servo system, and the corresponding means comprises a means for generating a corrected torque command based on the backlash correction command or on the offset data.

5. A servomotor Control apparatus according to claim 1, wherein the mechanical load is a machine tool or an industrial robot having a plurality of servo systems.

6. A servomotor control apparatus according to claim 1, wherein said discriminating means includes:
   means for determining, based upon the backlash correction command, a time at which a quadrant in the velocity-torque characteristic for an axis of the mechanical load reserves.

* * * * *

UNITED STATES PATENT AND TRADEMARK OFFICE
CERTIFICATE OF CORRECTION

PATENT NO. : 4,916,375

DATED : April 10, 1990

INVENTOR(S) : Kurakake et al.

It is certified that error appears in the above-identified patent and that said Letters Patent is hereby corrected as shown below:

| | |
|---|---|
| Col. 1, | line 64, "delays" should be --delay--. |
| Col. 2, | line 40, delete "compensating" ; |
| | line 41, after "for" insert --compensating--. |
| Col. 3, | line 11, after "is" insert --a--; |
| | line 27, delete "is"; |
| | line 41, "flaq" should be --flag--. |
| | line 43, "by a'" should be --by A',--; |
| | line 46, "In" should be --If--; |
| | line 48, delete "time". |
| Col. 4, | line 59, "storeing" should be --storing--. |
| Col. 5, | line 1, "Control" should be --control--. |

Signed and Sealed this

Sixteenth Day of July, 1991

Attest:

HARRY F. MANBECK, JR.

Attesting Officer     Commissioner of Patents and Trademarks